Aug. 25, 1953  G. T. PIPER  2,649,700
ABSORPTION-REFRIGERATING APPARATUS
Filed May 21, 1949

INVENTOR.
Glenn T. Piper
BY
Harry S. Bauer
ATTORNEY.

Patented Aug. 25, 1953

2,649,700

UNITED STATES PATENT OFFICE 2,649,700

ABSORPTION-REFRIGERATING APPARATUS

Glenn T. Piper, North Canton, Ohio, assignor to The Hoover Company, North Canton, Ohio, a corporation of Ohio Application May 21, 1949, Serial No. 94,599

11 Claims. (Cl. 62—118)

My invention relates to refrigerating apparatuses and more particularly to a novel method and apparatus for producing refrigeration utilizing a dry absorbent for the refrigerant.

It is a principal object of the invention to avoid the migration, packing and similar causes of deterioration which have been characteristic of prior dry absorption refrigerating apparatuses and methods.

It is a principal object of the present invention to provide an absorption refrigerating apparatus utilizing dry absorbent which is held within fine pores or cells in a rigid continuous metallic body.

It is a further object of my invention to provide a dry absorbent type refrigerating apparatus in which the absorbent is dispersed in the voids in a porous heat conducting and retaining body so arranged that refrigerant has access to large areas thereof and is not forced to flow through long paths within the absorbent during the absorbing and generating operations thereof.

It is a further object of the present invention to provide a novel method of charging a dry absorbent to a continuous porous metal retaining and heat conducting body therefor.

Figure 1:
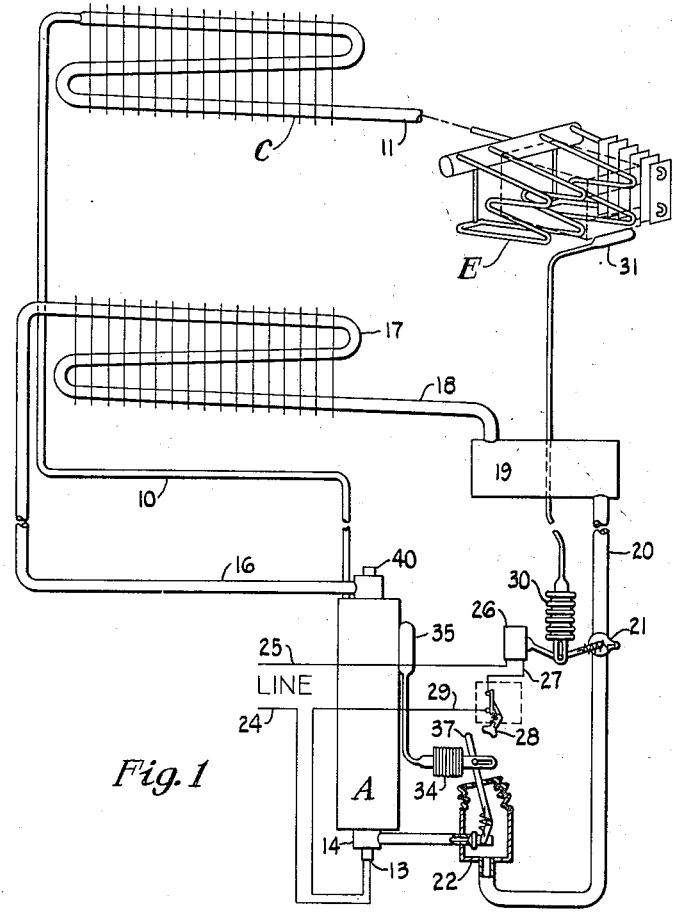
Figure 2:
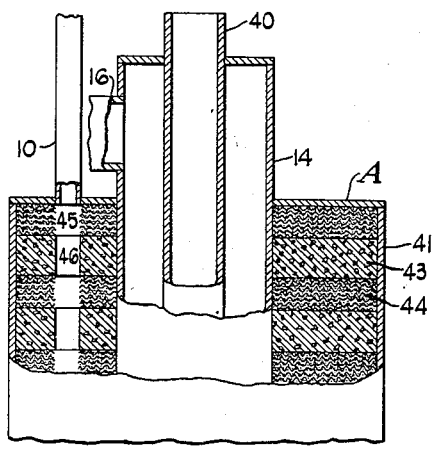

Other objects and advantages of the invention will become apparent as the description proceeds when taken in connection with the accompanying drawings in which:

Figure 1 is a schematic representation of a refrigerating apparatus embodying my invention; and Figure 2 is a partial sectional view drawn to an enlarged scale of the generator-absorber structure utilized in the apparatus of Figure 1.

I have discovered that dry absorbents such as strontium chloride, strontium bromide and calcium chloride can be effectively maintained in stable operating condition indefinitely in an operating generator-absorber without migrating or packing into hard inactive masses if the absorbent is retained dispersed through a porous continuous heat conducting and retaining structure. In particular, I have discovered that such absorbents may be charged in a manner to be described hereinafter into the voids in a sintered porous metal block which forms the holding means for the absorbent during operation thereof. The porous block serves as a heat conductor and as a means for retaining the absorbent in a very large number of minute individual bodies.

Figure 1 illustrates a refrigerating apparatus embodying my invention. This apparatus consists of a generator-absorber device A to be described more fully hereinafter. The generator-absorber is charged with a suitable absorbent for a refrigerant such as ammonia. Refrigerant flows into and out of the generator-absorber through a conduit 10 which connects to a tubular air cooled condenser C wherein the vapor is liquefied. The liquid formed in the condenser flows through a conduit 11 to an evaporator liquid receiver structure E of any desired type.

An electrical heating element 13 is positioned in the center of the generator-absorber structure A and is surrounded by an annular cooling jacket 14 to provide for heating and cooling the generator-absorber to cause the same to generate and absorb, respectively. The jacket 14 is part of a cooling system which comprises a pipe 16 connected between the upper portion of the jacket 14 and a tubular air cooled condensing element 17. The element 17 discharges through a conduit 18 into a cooling medium reservoir 19 from which the cooling medium returns to the jacket 14 through a conduit 20. The conduit 20 includes a first snap acting flow control valve 21 and a second snap acting flow control valve 22 for a purpose to be described more fully hereinafter. This system is charged with a volatile cooling medium such as methyl chloride.

The electrical heating element 13 is connected directly to one electrical supply line 24. The other electrical supply line 25 is connected to the heating element 13 through a first control switch 26, electrical conductor 27, a second snap acting control switch 28 and conductor 29.

The production of refrigeration in accordance with the demand therefor is governed by a thermostatic mechanism 30 having the bulb 31 thereof in contact with the cooling structure E. In the position shown the bulb 31 is expanded indicating a demand for refrigeration in which position the valve 21 is open and the switch 26 is closed so as to allow the cycling control mechanism to heat and cool the generator-absorber A, alternately.

The snap acting valve 22 and switch 28 are operated by a cycling control thermal element 34 which has the operating bulb 35 thereof in heat exchange relation with the exterior wall of the generator-absorber A. In the position of the apparatus shown, the thermostatic bulb 34 has just collapsed at the end of an absorbing operation and a generating operation has just begun. Consequently, the actuating lever 37, which is connected by a pin and slot arrangement to the bulb 34, has just operated the valve 22 to closed position to discontinue the flow of cooling medium into the jacket 14. This element has also operated the snap acting switch 28 to closed circuit position to energize the heating element 13 to produce a generating phase of operation. As the generator-absorber is heated vapor evolves from the absorbent therein contained, condenses in the condenser C, and collects in the receiver cooling structure E. When a pre-determined quantity of refrigerant has been evolved from the generator-absorber the temperature thereof begins to rise rather rapidly which in turn causes the bellows 34 to expand and rock the actuating lever 37 to the right as viewed in Figure 1. As the lever 37 shifts to the right it eventually operates the snap acting valve 22 to open position and the snap acting switch 28 to open circuit position thus de-energizing the heating element for the generator-absorber and permitting cooling fluid to flow into the jacket 14 thereof to cool the generator-absorber to the absorbing point and thereafter to reject the heat of absorption therefrom.

Referring to Figure 2, the generator-absorber details are illustrated on an enlarged scale. As shown here the cooling jacket 14 is annular with its inner portion defined by a tubular element 40 in which the electrical heating element 13 may be inserted or through which products of combustion may be passed for heating the generator-absorber if a combustible fuel burner is to be used for that purpose. The outer wall 41 of the generator-absorber structure A is spaced from the outer wall 14 of the cooling jacket to form an annular space therebetween within which are lightly pressed a plurality of spaced apart absorbent containing plates 43. The plates 43 are annular so as to fit with mild pressure against the walls 14 and 41 to insure good heat conductivity to each of them. Each of the plates 43 consists of a rigid, continuous, porous structure of sintered powdered metal having a multiplicity of fine pores or cells charged with a dry absorbent such as strontium chloride, strontium bromide or calcium chloride. The plates are preferably constructed to have approximately 40 to 50% porosity so that the density of the uncharged porous metallic block is approximately 40 to 50% the density of an equal weight of a solid block of the same material. It is preferable to construct the block 43 of sintered stainless steel. Other materials may be used provided they do not react or are treated to render them non-reactive with ammonia at the maximum generating temperatures encountered in the operation of the device. All parts of the apparatus which contact ammonia substantially above atmospheric temperatures should be constructed of materials such as stainless steel which do not react with ammonia.

The annular spaces between the bodies 43 are taken up by a plurality of vapor distributing screens indicated generally at 44. Instead of screens, blocks of sintered porous metal identical with the blocks 43 except that they are not charged with refrigerant may be used in place thereof. The sole purpose of these screens or blocks is to provide for free distribution of the vapor into all portions of the absorbent contained in the plates 43 over the entire areas thereof and to bring a surface to bear on the exposed surfaces of these elements fine enough to permit free passage of vapor but too fine to permit absorbent to migrate from the plates 43. To this end the screens and plates are pressed with a mild pressure against each other inside the casing 41. The various screens 44 and plates 43 are provided with bores 45 and 46, respectively, to allow free vertical passage of the vapor through the generator-absorber to each group of screens. Those portions of the plates 43 constituting the walls of the bore 46 may have a small solid pipe section therein or the walls of the sintered metal may be fused solid at these points in order to prevent absorbent from migrating out of the plates into the vapor passages.

Since the screens 44 perform a distributing function and a retaining function, it has been found desirable to build up from an extremely fine screen, which is inherently weak structurally, to a much coarser but structurally stronger screen. In this way the requisite fineness of passage in contact with the absorbent containing block is achieved and the necessary mechanical strength is provided to prevent the absorbent from migrating into the screen structure. For example, it has been found satisfactory, to build up a series of five screens comprising two, two hundred mesh screens in contact with the impregnated porous metal plates, 150 mesh screens contacting the 200 mesh screens and a 40 mesh screen sandwiched between the 150 mesh screens. This combination provides ready flow of the vapor from the bore 45 annularly around the screens and ready penetration of the vapor over the entire space of the impregnated plates, however, other screen combinations or sintered block arrangements are within the purview of the invention. Whether screens or porous distributing plates are utilized for distributing the vapor over the faces of the impregnated plates it is necessary that they be constructed of material which is inherently inert to ammonia such as stainless steel or are treated to render them non-reactive to ammonia such as being provided with a firm, non-flaking adherent, nitride coat.

The plates 43 should be charged with absorbent in a quantity sufficient to be saturated by from 55 to 65 grams of ammonia per 100 cc. of void volume in the plates 43. The charge is referred to the quantity of ammonia required to saturate the amount of absorbent contained per 100 cc. of void volume in order to provide a common basis of reference for various absorbents. For example 55.5 and 64.2 grams of ammonia will saturate 65 and 75 grams of strontium chloride, 101 grams and 116 grams of strontium bromide and 43.3 and 52.5 grams of calcium chloride, respectively. Therefore, once the desired absorbent is decided upon, the foregoing relations establish the weight of the particular absorbent to be charged per 100 cc. of void volume in the plates 43. Hereinafter in this specification and appended claims, the absorbent charge is expressed as that quantity of absorbent charged to each 100 cc. of void volume in the porous plates which is saturated by a given weight of ammonia expressed in grams.

In the operation of this apparatus the refrigerant must flow through the absorbent during the absorbing and generating operations. It has been found that the refrigerant path through absorbent should not exceed approximately ⅛ inch. Where the absorbent is dispersed in small bodies through a porous heat conducting and retaining plate it is preferable to restrict the refrigerant flow path through absorbent to approximately $\frac{1}{16}$ inch. Therefore, if the absorbent charged porous retainer is in the form of thin plates having free access to a vapor conductor at opposite surfaces, as illustrated in Figure 2, the thickness of the plates should not exceed ¼ inch at all events and ⅛ inch thick plates are preferred.

The method of charging the sintered porous metal disks is as follows: For purposes of explanation it is assumed that it is desired to charge the porous metal body with 70 grams of strontium chloride per 100 cc. of void volume. The procedure is unchanged by the choice of other absorbents or charging ratio. The absorbent is obtained in the form of the saturated hexahydrate, that is, each molecule of the strontium chloride is associated with six molecules of water; consequently, each gram of the strontium chloride is associated with 0.68 gram of water. Since the final product desired contains 70 grams of strontium chloride per 100 cc. of volume the calculations are conducted on this basis. Seventy grams of strontium chloride in the hexahydrate is associated with 47.6 grams of water, therefore, 117.6 grams of the hexahydrate are placed in a container and hot distilled water added thereto, while heating if necessary, to form a highly concentrated warm solution of the absorbent. The solution is then diluted until the solution volume is 100 cc. for each 117.6 grams of the hexahydrate originally placed in the vessel. The porous metal plate is then placed in the resulting concentrated solution. The solution and plate are maintained at a temperature of approximately 100° C. until all air bubbles are removed therefrom which requires approximately one-half hour. In this way the entire void volume of the porous metal element is filled with the hot concentrated solution of the absorbent. The porous body is maintained submerged in the hot solution which is allowed to cool slowly until it solidifies. The porous metal body is cut out of the solid solution and excess material scraped from the surfaces thereof. The porous metal body is then placed in a dessicator for approximately forty-eight hours in order to remove combined moisture at a very slow rate. The impregnated plate is then placed in a drying oven for a period of twenty-four hours. The oven temperature is increased at the rate of approximately 10° C. per hour up to a temperature of 150° C. at which temperature it is maintained for the remainder of the drying period. The above described slow drying process removes moisture efficiently and at a rate too slow to cause solution to bubble out of the pores of the disk. After the disks are removed from the drying oven they should immediately be placed in the generator-absorber assembly and the same welded up. This whole assembly may now be heated to a temperature as high as 200° C. while a very high vacuum is drawn on the vessel so as to remove residual traces of moisture from the entire apparatus after which the same is sealed and maintained in that condition until the refrigerant is charged.

Once the generator-absorber is charged with an absorbent containing element and dried as above specified it is welded into the remainder of the apparatus constituting the condenser and cooling unit receiver assembly. This assembly is then connected to a charging drum and refrigerant such as ammonia allowed to enter the unit at a slow rate until the absorbent contained in the impregnated porous metal element is fully saturated with the refrigerant. The apparatus is now ready for operation.

The apparatus constructed in accordance with this invention provides a structure in which the absorbent is held in finely divided pores in a rigid, continuous metal plate providing a continuous metallic heat conducting path through all portions of the body to the absorbent. Since the absorbent is dispersed through the fine voids in the plate, the heat flow path through absorbent as such is very minute. Additionally, the structure provides a means by which the refrigerant diffuses into and out of the absorbent through rather short paths so as to prevent the development of unequalized pressures in the impregnated metallic body which might tend to cause rupture thereof or migration of the absorbent.

While I have illustrated and described the invention in considerable detail, it is to be understood that various changes may be made in the arrangement, proportion and construction of parts without departing from the spirit of the invention or the scope of the appended claims.

I claim:

1. Absorption refrigerating apparatus comprising a generator-absorber vessel, a plurality of spaced apart porous metal heat conducting elements in said vessel and in heat exchange relation therewith, a solid absorbent in the pores of said heat conducting elements, each 100 cc. of void volume in said heat conducting elements being charged with a quantity of said absorbent sufficient to be saturated by from 55 to 65 grams of ammonia, a vapor conveying structure positioned between each pair of adjacent heat conducting elements and in contact therewith, said heat conducting elements and said vapor conveying structure being so constructed and arranged that the maximum distance of any part of said heat conducting elements to said vapor conducting structure does not exceed ⅛ inch, and means for conducting vapor to and from said vapor conducting structure.

2. Absorption refrigerating apparatus comprising a generator-absorber vessel, means for alternately heating and cooling said vessel, a continuous porous sintered metal body within and in heat exchange relation with said vessel, a solid absorbent charged in the pores of said porous metal body, and means for conducting refrigerant vapor to and from the interior of said vessel.

3. Absorption refrigerating apparatus comprising a generator-absorber vessel, means for alternately heating and cooling said vessel, a continuous porous sintered metal body within and in heat exchange relation with said vessel, a solid absorbent charged in the pores of said porous metal body, a refrigerant vapor distributing structure having a surface contacting a surface of said sintered metal body and having vapor passages through said contacting surface which are too fine to pass said absorbent, and means for conducting refrigerant vapor to and from said sintered metal body.

4. Absorption refrigerating apparatus comprising a rigid continuous porous metal heat conducting body, a solid absorbent retained in the pores of said body, means for conducting heat to and from said body, and means for conducting refrigerant vapor to and from said body.

5. Apparatus according to claim 4 in which said heat conducting means comprises a pressure retaining vessel in heat exchange relation with said porous body and means for heating and cooling said vessel, and said vapor conducting means comprises a porous body having vapor passages therein terminating in pores through a surface in contact with said porous body.

6. An absorption refrigerating apparatus including a generator-absorber vessel, means for alternately heating and cooling said vessel, a continuous porous heat conducting body having a solid absorbent in the voids thereof mounted in said vessel and in heat exchange therewith, and means in said vessel contacting the faces of said body not in contact with said vessel for retaining absorbent in said body and for conducting refrigerant to and from said faces of said body.

7. Apparatus according to claim 6 in which said heat conducting body and said refrigerant conducting means are so constructed and arranged that no portion of said heat conducting body is distant from said refrigerant conducting means by an amount exceeding ⅛ inch and the absorbent charged to each 100 cc. of void volume in said heat conducting body is within the range of quantity to be saturated by from 55 to 65 grams of ammonia.

8. A generator-absorber structure for absorption refrigerating apparatus comprising a vessel, a plurality of spaced apart porous metal continuous heat conducting bodies in said vessel, means for alternately heating and cooling said bodies, a solid absorbent charged in the voids of said bodies, and means contacting certain surfaces of said bodies for retaining absorbent in said bodies and for conducting refrigerant vapor to and from said surfaces.

9. Apparatus according to claim 8 in which said bodies are in the form of thin plates of sintered powdered metal.

10. Apparatus according to claim 8 in which said refrigerant vapor conveying means are in the form of groups of screens with each group of screens positioned between adjacent spaced heat conducting bodies and each group of screens comprises an outer pair of fine mesh screens each contacting a surface of one of said heat conducting bodies and a plurality of heavier coarser mesh screens positioned between said outer screens.

11. Apparatus according to claim 8 in which said bodies are in the form of thin plates of sintered powdered metal approximately ⅛ inch in thickness charged with a quantity of absorbent per 100 cc. of void volume in said plates sufficient to be saturated by from 55 to 65 grams of ammonia, and said refrigerant vapor conveying means comprises groups of screens with each group positioned to contact the facing surfaces of adjacent absorbent charged plates, each of said group of screens comprising an outer pair of fine mesh screens each contacting one of said facing surfaces and a plurality of heavier coarser screens between said outer pair of screens, and means for conducting refrigerant vapor to and from each of said groups of screens.

GLENN T. PIPER.

References Cited in the file of this patent

UNITED STATES PATENTS

| Number | Name | Date |
| --- | --- | --- |
| 955,762 | Chisolm | Apr. 19, 1910 |
| 1,169,349 | Icaza | Jan. 25, 1916 |
| 1,829,370 | Rohl | Oct. 27, 1931 |
| 1,906,154 | Hemann | Apr. 25, 1933 |
| 1,961,890 | Miller | June 5, 1934 |
| 1,972,426 | Noebel | Sept. 4, 1934 |
| 2,224,219 | Dasher | Dec. 10, 1940 |
| 2,384,460 | Kleen | Sept. 11, 1945 |

FOREIGN PATENTS

| Number | Country | Date |
| --- | --- | --- |
| 285,798 | Great Britain | 1929 |
| 331,540 | Great Britain | 1930 |
| 500,269 | Great Britain | 1939 |